Aug. 29, 1961 J. GOLD ET AL 2,998,343
PROCESS FOR MAKING A HYDRAULIC DIAPHRAGM
Filed Jan. 2, 1958
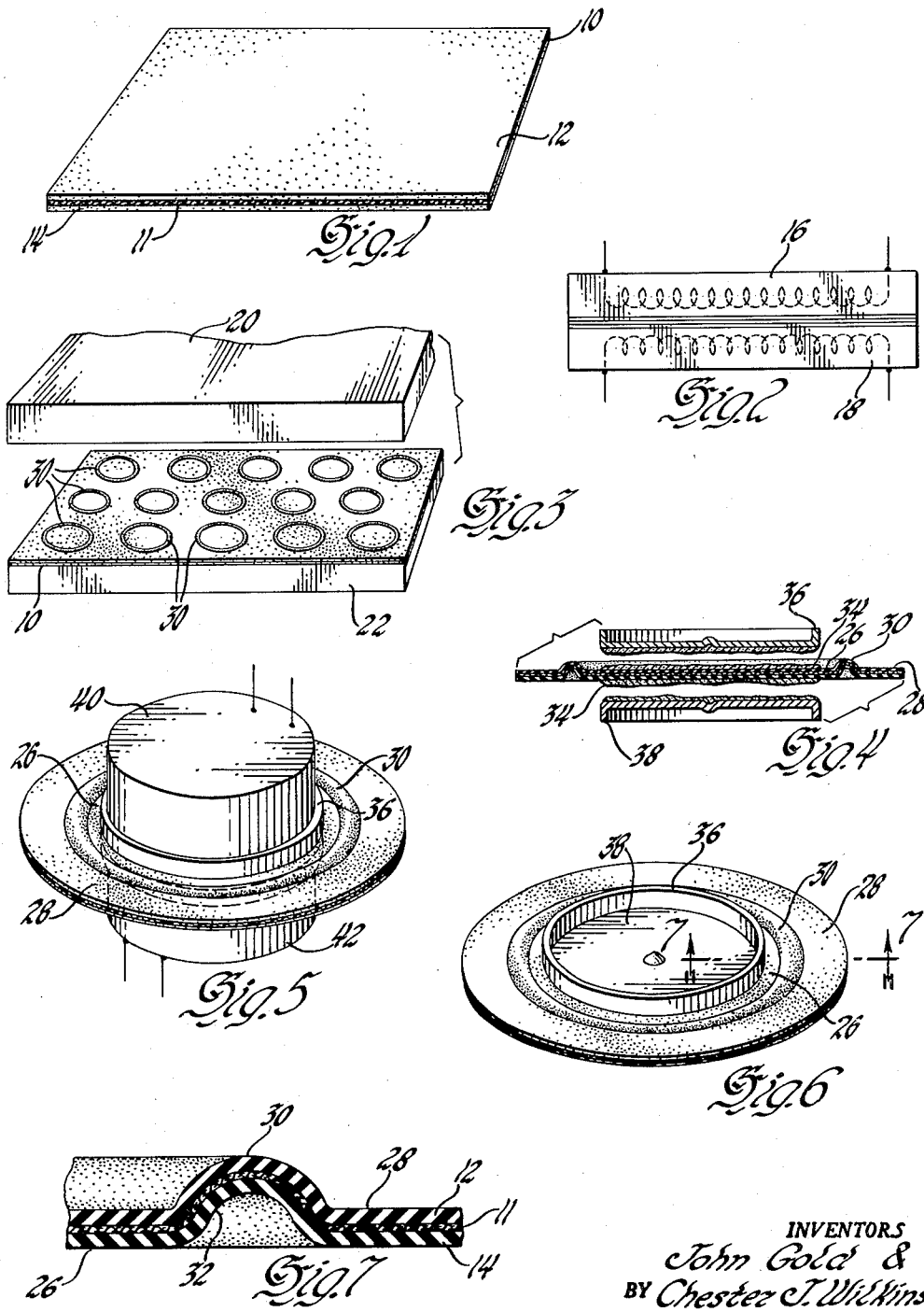
INVENTORS
John Gold &
BY Chester J. Wilkinson
ATTORNEY 2,998,343
Patented Aug. 29, 1961

2,998,343
PROCESS FOR MAKING A HYDRAULIC DIAPHRAGM

John Gold and Chester J. Wilkinson, Flint, Mich., assignors to General Motors Corporation, Detroit, Mich., a corporation of Delaware
Filed Jan. 2, 1958, Ser. No. 706,668
2 Claims. (Cl. 154—129)

This invention relates to flexible diaphragms suitable for exposure to fluid pressure in connection with use in diaphragm pumps and valves, dash pots, hydraulic regulators and the like. More particularly the invention relates to a method for making a hydraulic diaphragm.

Flexible diaphragm structures of the type to which the present invention relates, generally consist of a flexible, flat central circular portion and a flat annular peripheral portion joined by a deep substantially U shaped convolution or fold. In assembled relation with a pressure responsive apparatus the flat peripheral portion of the diaphragm is clamped between cooperating annular portions of a housing and the central circular portion is permitted to flex and move reciprocably within the limits allowed by the annular fold or convolution as is well known in the art. In some instances it may be desirable to attach metallic re-enforcing elements or actuating elements such as pistons and the like to the flat central portion of the diaphragm.

Among the objects of this invention is to provide an economical and efficient process for the manufacture of flexible diaphragms which produces an economical and efficient diaphragm having outstanding life characteristics under flexing. These and other objects are accomplished by first impregnating and coating a strong and durable fabric made of chemical resistant material such as nylon with an elastic protective material such as Buna N rubber resistant to attack by fluids such as gasoline, hydraulic oils, lubricating oils and the like to which the diaphragm may be exposed. Next, the rubber-coated fabric is partially cured. Thereafter and while the rubber is in a partially cured state, the rubber coated fabric is subjected to a molding operation between complementary mold members whereby a substantially U shaped annular fold or convolution is formed therein. In the partial curing operation the rubber is cured to reduce the flowability of the uncured rubber to an extent sufficient to prevent its being squeezed out of the area of the fold or convolution during the molding operation. The molded partially rubber-coated fabric is then completely cured to form a diaphrgam in which the fabric portion thereof is substantially centrally located in relation to the rubber portions within the fold portions of the diaphragm as well as the flat portions thereof.

If it is desired to attach metal reinforcing members or actuating members such as pistons to the central portions of the diaphragm, a suitable adhesive for bonding metal to rubber is applied onto the central portion of the diaphragm after the molding step and before the diaphragm is finally cured. The metal members are then placed against the adhesive coated surface and are subjected to preferably induction heating whereby the adhesive and the adjacent rubber are simultaneously cured to form a bond between the metal element and the rubber. Finally the entire assembly is subjected to heat and completely cured.

Other objects and advantages of the invention will become apparent from the following description, reference being had to the accompanying drawings whereby a preferred embodiment of the invention is clearly shown.

In the drawings:

FIG. 1 is a perspective view of a fabric sheet impregnated and coated with a rubber.

FIG. 2 is a diagramatic view illustrating complementary heating plates suitable for partially curing the sheet material of FIG. 1.

FIG. 3 is a partial perspective view of a molding apparatus suitable for forming folds or convolutions in the sheet of FIG. 1.

FIG. 4 is an exploded cross-sectional view of a molded diaphragm having an adhesive applied to the central portion thereof, preparatory to bonding metal piston elements thereto.

FIG. 5 is a perspective view of an induction heating device associated with diaphragm of FIG. 4 in assembled form.

FIG. 6 is a perspective view of a completed diaphragm.

FIG. 7 is a broken-away cross-sectional view taken along line 7—7 of FIG. 6.

In carrying out the process of the present invention, a base fabric made of suitably strong and chemically resistant material such as nylon is first impregnated and coated with a suitable rubber such as Buna N, resistant to attack by hydrocarbon fluids such as gasoline, fuel oils, hydraulic oils and the like. Other rubbers may be used depending on the fluid to which the diaphragm is to be exposed. The use of a base fabric is essential in connection with a rubber such as Buna N because of the comparatively low tensile strength of the latter. The rubber is preferably applied to the base fabric in a thin and uncured state by means of a scraper and the fabric is then preferably passed in the direction of the warp between calendering rollers which are supplied with the uncured rubber in a somewhat thicker condition in a manner well known in the art. As is shown in FIG. 1, the rubber-coated sheet 10 consists of a base fabric 11 impregnated with the uncured rubber and having uncured rubber coatings of substantial thickness 12 and 14 on each side thereof.

The term "rubber" as used herein, is intended to include both natural rubber and synthetic rubber such as butadiene-acrylonitrile copolymers (Buna N), butadiene-styrene copolymers, polychloroprene, polysulfide rubbers and mixtures of these and other similar materials having elastomeric properties well known in the art.

After the uncured rubber coated sheet 10 of FIG. 1 is formed, it is inserted between the complementary, preferably electrically heated platens 16 and 18 or into a conventional rubber curing oven to partially cure the rubber. This partial curing of the rubber coated fabric sheet is an essential aspect of the invention as will appear hereinafter.

The partially cured rubber coated sheet 10 is next placed between a pair of complementary upper and lower mold halves or dies 20 and 22 respectively which include preferably a plurality of generally U shaped annular ridges on the male half and complementary U shaped grooves on the female half whereby when the mold halves 20 and 22 are clamped together under pressure with a sheet 10 therebetween, a plurality of annular substantially U shaped depressions or folds 30 are formed in the partially cured rubber coated fabric sheet 10. The sheet 10 may then be cut in an obvious manner to produce a plurality of partially cured diaphragms such as is shown in FIG. 4 including a circular flat central portion 26 and an outer flat annular peripheral portion 28 joined by a generally U shaped convolution or fold 30.

As mentioned above an essential aspect of the invention involves the step of partially curing the sheet 10 prior to the molding operation. It will be observed that uncured rubber readily deforms and flows whereas the fabric, particularly nylon, resists deformation strongly. If the step of partially curing the sheet 10 prior to the molding operation is omitted, the annular ridge of the male mold member operates to depress or squeeze out the rubber between it and the fabric as it is forced against the difficulty deformable fabric with the result that the fold 30 as shown in FIG. 7 would be formed having the fabric layer disposed adjacent the inner surface 32 thereof. Thus the fabric 11 which provides the diaphragm with strength and long life characteristics would be readily exposed to attack by the fluids to which the diaphragm is exposed with consequent rapid deterioration of the diaphragm. Accordingly, in the partially curing step, the rubber is cured to a degree such that it resists flow during the molding operation sufficiently to prevent its being squeezed out as above described and yet permit its being molded into the desired configurations.

After the molding operation, the diaphragm may be finally cured. However, in some instances it may be desired to associate reinforcing elements and actuating elements such as pistons with the central surface of the diaphragm. To this end, after the molding step, the central portions 26 of the partially cured diaphragm as shown in FIG. 4 are coated with a suitable adhesive 34 on each side thereof and the piston elements 36 and 38, after being cleaned with a suitable solvent such a methylethyl ketone or acetone, are placed against the adhesive under suitable pressure while the diaphragm is supported in a suitable fixture (not shown). The metal piston elements 36 and 38 are then heated preferably by induction heating elements 40 and 42 whereby the adhesive 38 and the adjacent rubber portions of the diaphragm are simultaneously cured and the piston elements are firmly bonded to the diaphragm. Thereafter, the entire assembly is heated and completely cured to form the finished diaphragm as is shown in FIG. 6. As is shown in FIG. 7, the resultant structure has the base fabric portion 11 centrally located over the rubber portions 12 and 14 both in the area of the fold portions 30 and the central and outer portions 26 and 28 respectively whereby the base fabric is substantially uniformly and coextensively covered by the protective rubber.

In a specific preferred example of the invention the fabric, as aforementioned, is preferably made of nylon. By the term nylon as used herein is meant polyamides and superpolyamides such as are disclosed in the U.S. Patents 2,071,253 and 2,130,948 and are well known in the art. A specific Buna N rubber formulation suitable for coating the base fabric is as follows:

| | Parts |
|---|---|
| Butadiene-acrylonitrile copolymer | 47.40 |
| Zinc oxide | 4.80 |
| Stearic acid | .20 |
| Altax accelerator (benzothiazyl disulfide) | 1.4 |
| Tauds accelerator (tetramethyl thiuram disulfide) | 1.4 |
| Sulphur | .20 |
| Mineral oil | 7.0 |

After the nylon fabric is coated with the Buna N rubber as above described to form the sheet 10, it is partially cured by subjecting it to heat between the heating elements 16 and 18 at a temperature of about 300° F. for about 4 minutes. The partially cured rubber coated sheet is then molded to the desired shape of the diaphragm by the mold halves or dies 20 and 24 having the working faces thereof coated preferably with a silicon mold release agent and maintained at about 325° F., by compressing the sheet between the heated die members for a period of about one minute. After the molding step, the diaphragm may be finally cured in an oven at about 320° F. for about 26 minutes. In the preferred embodiment of the invention, the diaphragm is provided with adhesively applied metal piston elements as above described. For this purpose, the preferred adhesive is a thermosetting composition resistant to attack by hydrocarbon oils comprising a butadiene-acrylonitrile copolymer (Buna N) mixed with a compatible phenol-formaldehyde resin in a suitable solvent such as toluene and preferably a mixture of 60% toluene and 40% cyclohexanone. The phenol-formaldehyde resin is preferably an A-stage alcohol soluble phenol-formaldehyde condensation product condensed in a molecular ratio of from one mold of phenol to 0.7–3 moles of phenol-formaldehyde prepared either with acid or basic catalyst and neutralized in a well-known manner. The proportion of the constituents may vary by weight of from 20 to 50 parts of the A-stage of phenol-formaldehyde resin to 100 parts of the butadiene-acrylonitrile copolymer. After the adhesive is applied to the central portion 26 of the molded diaphragm, the adhesive is dried by inserting it in a drying oven maintained at 120° F. for a period of about 18 minutes. The piston elements 36 and 38 are then pressed against the dried adhesive 34 under pressures of 10 to 15 pounds per sq. inch as shown in FIG. 6 and are induction heated to a temperature of about 300°–350° F. for about 3 seconds. After about 9 seconds cooling time, the diaphragm, now having the pistons bonded thereto, is placed in a curing oven maintained at about 310° for about 26 minutes and is fully cured.

It is to be understood that the specific Buna N rubber formulation disclosed may be varied considerably with respect to proportions and the various additives such as accelerators, fillers, plasticizers and various other materials such as antioxidants and age resisting compounds may be added. Other rubber formulations of materials such as natural rubber, butadiene-styrene copolymers, polychloroprene and polysulfide rubbers and similar materials as are well known in the art and are disclosed in the Vanderbilt Rubber Handbook published in 1948 may be used. Various other adhesives may also be used in the process which are of a thermosetting type and are capable of bonding metal to rubber. For example, in place of the Buna N rubber in the specific formulation set forth above, other rubber such as butadiene-styrene copolymers may be substituted. The choice of the particular rubber and the adhesive to be used is dependant to a large extent on the use to which the diaphragm is to be put. The preferred embodiment disclosed herein is particularly suitable for manufacturing diaphragms to be used in hydraulic regulators wherein the diaphragm is exposed to hydraulic oils.

While the embodiments of the present invention as disclosed herein constitute a preferred form, it is to be understood that other forms may be adopted.

We claim:

1. In a process for making a hydraulic diaphragm, the steps comprising forming a sheet including a polyamide fabric layer impregnated and coated on each side thereof with a layer of uncured butadiene-acrylonitrile rubber of substantially equal thickness, partially curing said rubber, molding an annular fold in said sheet between complementary die members, said rubber being cured to an extent sufficient to prevent substantial displacement of the rubber relative to the fabric in the molding process, applying a butadiene-acrylonitrile phenol formaldehyde adhesive to a partially cured rubber surface of said sheet, applying a metal member against said adhesive surface under pressure, induction heating said metal member to effect simultaneous cure of said adhesive and said rubber and bond said metal element to said rubber, and finally completely curing said rubber.

2. In a process for making a hydraulic diaphragm, the steps comprising forming a sheet including a fabric layer impregnated and coated on each side thereof with a layer of uncured rubber of substantially equal thickness, partially curing said rubber, molding an annular fold in said sheet, said rubber being cured to a sufficient extent to prevent substantial displacement of the rubber in relation to said fabric during the molding operation, applying a thermosetting heat curing adhesive to said rubber surface adapted to bond metal to rubber, applying a metal member to said adhesive under pressure while heating said metal member to effect simultaneous curing of said adhesive and said rubber, and then completely curing the rubber.

References Cited in the file of this patent

UNITED STATES PATENTS

| | | |
|---|---|---|
| 1,211,351 | Price | Jan. 2, 1917 |
| 1,226,236 | Meyer et al. | May 15, 1917 |
| 1,352,739 | Egerton | Sept. 14, 1920 |
| 1,484,937 | Egerton | Feb. 26, 1924 |
| 1,515,381 | Boyer et al. | Nov. 11, 1924 |
| 1,691,347 | Gray | Nov. 13, 1928 |
| 2,183,984 | Campbell | Dec. 19, 1939 |
| 2,275,712 | Zand | Mar. 10, 1942 |
| 2,520,978 | Super | Sept. 5, 1950 |
| 2,561,215 | Mighton | July 17, 1951 |
| 2,581,926 | Groten et al. | Jan. 8, 1952 |
| 2,775,983 | Johnson et al. | Jan. 1, 1957 |

FOREIGN PATENTS

| | | |
|---|---|---|
| 352,829 | Great Britain | July 16, 1931 |
| 775,677 | Great Britain | May 29, 1957 |